United States Patent [19]
Itoh

[11] Patent Number: 5,579,025
[45] Date of Patent: Nov. 26, 1996

[54] DISPLAY CONTROL DEVICE FOR CONTROLLING FIRST AND SECOND DISPLAYS OF DIFFERENT TYPES

[75] Inventor: Shuhei Itoh, Hamamatsu, Japan

[73] Assignee: Yamaha Corporation, Hamamatsu, Japan

[21] Appl. No.: 227,182

[22] Filed: Apr. 13, 1994

Related U.S. Application Data

[63] Continuation of Ser. No. 784,898, Oct. 30, 1991, abandoned.

[30] Foreign Application Priority Data

Oct. 31, 1990 [JP] Japan .................................... 2-295609

[51] Int. Cl.$^6$ .................................................. G09G 5/00
[52] U.S. Cl. .............................................. 345/3; 345/213
[58] Field of Search ................................... 340/716, 717, 340/814, 784, 720, 811; 358/148; 345/1, 2, 3, 213

[56] References Cited

U.S. PATENT DOCUMENTS

| | | | |
|---|---|---|---|
| 4,760,387 | 7/1988 | Ishii et al. ............................... | 340/717 |
| 4,926,166 | 5/1990 | Fujisawa et al. ....................... | 340/814 |
| 5,111,190 | 5/1992 | Zenda ...................................... | 340/717 |
| 5,138,305 | 8/1992 | Tomiyasu ................................ | 345/3 |
| 5,218,274 | 6/1993 | Zenda ...................................... | 345/3 |

OTHER PUBLICATIONS

Seiko Epson Corp., '89 CMOS LSI Data Book, 1989, pp. D-62 through D-67 and an unnumbered page.

*Primary Examiner*—Richard Hjerpe
*Assistant Examiner*—Chanh Nguyen
*Attorney, Agent, or Firm*—Loeb & Loeb LLP

[57] ABSTRACT

A display control device performs, in accordance with an application program prepared for a first display, a display control for a second display which has a different display timing from the first display. The device includes a clock generation circuit for generating a basic clock for driving the second display, a first controller and a second controller. The first controller includes a first timing control register capable of rewriting in accordance with the application program. The second controller includes a second timing control register for setting a display timing of the second display and generating a synchronizing signal for the second display on the basis of contents of the second timing control register and the basic clock. The first controller is operated by the basic clock and generates a timing signal for the second display on the basis of the synchronizing signal for the second display and the contents of the first timing control register. Even in a case where contents of the first timing control register have been rewritten by the application program, the first controller generates various timing signals based on the basic clock and the synchronizing signal for the second display and, therefore, it does not affect the display operation of the second display.

21 Claims, 5 Drawing Sheets

DISPLAY CONTROL DEVICE FOR CONTROLLING FIRST AND SECOND DISPLAYS OF DIFFERENT TYPES

This is a continuation of application Ser. No. 07/784,898, filed Oct. 30, 1991, now abandoned.

BACKGROUND OF THE INVENTION

This invention relates to a display control device for controlling, in accordance with an application program for a CRT display, for example, such displays as a liquid crystal panel display and a plasma panel display which have a different display timing from that of the CRT display.

With the recent trend of reducing the size of the office automation equipments such as personal computers and word processors, panel type displays such as liquid crystal and the plasma displays are taking the place of CRT displays.

Meanwhile, such panel type displays as mentioned above usually have a different display timing from that of the CRT displays. Therefore, in order to drive the panel displays by an application program designed for the CRT displays, the following methods have been adopted:

The first method is to set, in accordance with an initially set program, contents of a timing control register of an existing CRT controller so that they fit with the panel timing.

The second method is to write data produced from the CRT controller at the CRT timing in a frame buffer and then deliver it out in accordance with the panel timing.

In the first method, it is necessary to change the program of the timing control register in the CRT controller when changing its display mode such as switching of the resolution and the graphic/text in accordance with the application program. However, since the application program is usually designated for the CRT display, if such rewriting of the register program is allowed, the timing for the panel display set by the initial setting will be impaired.

Therefore, it has conventionally been practiced to prohibit rewriting of the timing control register in subsequent processing by the application program by providing a protect flag in order that the register program for the timing control can not be rewritten by the application program. In this case, however, the display mode can not be changed.

It has also been practiced to provide a local CPU or logic circuits additionally in order that it can recognize mode change and after that change the CRT timing to the timing for the panel display and finally write it in the controlling register in the CRT controller. In this case, however, there arises the problem that the cost of the components is increased.

In the second method, there is also the problem that the cost of the whole system is increased as in the first case, as it necessiates the frame buffer and a dot clock reproduction circuit (PLL circuit) for the panel display.

Therefore, it is an object of this invention to provide a display control device capable of smoothly controlling, in accordance with the application program, plural displays that have different timing from each other, without causing a substantial increase in the cost of components.

SUMMARY OF THE INVENTION

The display control device achieving the above described object of the invention which, in accordance with an application program prepared for a first display, performs a display control for a second display which has a different display timing from the first display comprising clock generation means for generating a basic clock for driving the second display, a first controller including a first timing control register capable of rewriting in accordance with the application program, and a second controller including a second timing control register for setting a display timing of the second display and generating a synchronizing signal for the second display on the basis of contents of the second timing control register and the basic clock, said first controller being operated by the basic clock and generating a timing signal for the second display on the basis of the synchronizing signal for the second display and the contents of the first timing control register.

According to this invention, the second controller generates, based on the contents set by the second timing control register and the basic clock for the second clock, the synchronizing signal for the second display.

Meanwhile, the first controller, when achieving display of the second display, operates based on the basic clock for the above described second display, and generates various timing signals based on the synchronizing signal for the said second display and the contents set in the first timing control register.

According to this invention, therefore, even in the case where the contents of the first timing control register provided in the first controller have been rewritten by using the application program, the first controller generates and outputs various timing signals based on the basic clock and the synchronizing signal for the second display and, therefore, it does not affect the display operation of the second display.

Since the display operation of the second display is based on the contents of the first timing control register, it is possible to display it in the display mode in accordance with the application program.

Since this invention aims at providing a method for causing the basic clock on which the first controller is based and the synchronizing signal on which timing is based to conform to the display timing of the second display, and not a method for rewriting the contents of the first timing control register provided in the first controller, it does not necessiate the local CPU and the logic to achieve arithmetic operation as well as the frame buffers to synchronize the timing. Therefore the cost for the components can be decreased.

An embodiment of the invention will be described below with reference to the accompanying drawings.

DESCRIPTION OF A PREFERRED EMBODIMENT

Figure 1:
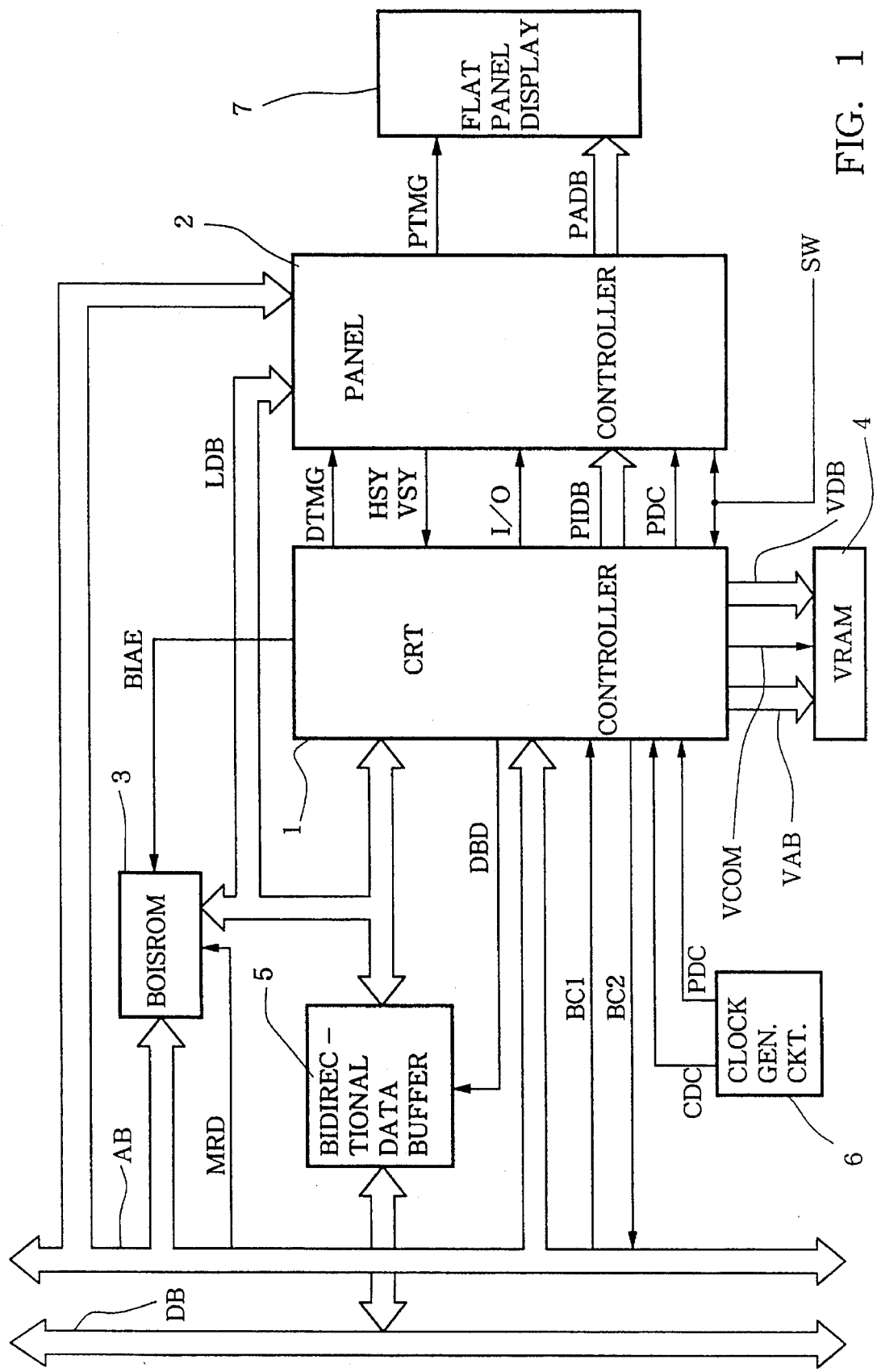
FIG. 1 is a block diagram of a display controller of an embodiment of this invention.

FIG. 1 is a block diagram showing a construction of the display controller of this embodiment.

In FIG. 1, for convenience of description, only a flat panel display 7 consisting, for example, of a liquid crystal panel is illustrated as the display which is the object of control. However, this controller is capable of selectively achieving a display control for either the flat panel display or an unillustrated CRT display by switching between them.

Accordingly, this controller comprises a CRT controller 1 for driving the CRT display and a panel controller 2 for driving the flat panel display 7. These controllers 1 and 2 are connected to a BIOS, (basic input/output system)—ROM 3 through a local data bus LDB in order to access to a basic input/output routine stored in the BIOS-ROM 3, based on a memory read signal MRD as a control signal for the system bus and a BIOS-ROM access enable signal BIAE produced by the CRT controller 1.

The CRT controller 1 is connected further to a system address bus AB as well as to a system data bus DB through a bidirectional data buffer 5. The bidirectional data buffer 5, based on a data bus direction signal DBD produced by the CRT controller 1, decides a direction of sending of the data. In the CRT controller 1, a bus control signal BC1 such as an I/O command and a memory command is applied from the side of the system bus, and from the CRT controller 1, a bus control signal BC2 such as an interrupt request signal and a ready signal is applied to the system bus. In this manner, the CRT controller 1, accessed by an unillustrated main CPU which is connected to the buses AB and DB, achieves sending and receiving of the data with the I/O reciprocally.

To the CRT controller 1 are connected a VRAM4, i.e. a display memory where data to be displayd is stored, and a clock generation circuit 6 to output a CRT dot clock CDC and a panel dot clock PDC. The CRT controller 1 generates a display address for the VRAM4, achieves designation of address through a display memory address bus VAB, and inputs display data through a display memory data bus VDB at the timing indicated by a display memory command VCOM such as a read/write signal.

Further, the CRT controller 1 selects and inputs one of the clock signals CDC and PDC in response to a display selection signal SW, receives synchronizing signals HSY and VSY produced by the panel controller 2, and, as a result, produces a panel display timing signal DTMG based on these signals. Then, the CRT controller 1, in response to the panel display timing signal DTMG, supplies the display data read from the VRAM4 to the panel controller 2 through a pixel data bus PIDB. From the CRT controller 1 also is supplied the I/O command signal I/O to the panel controller 2.

The panel controller 2 generates the synchronizing signals HSY and VSY based on the panel dot clock PDC, outputs them to the CRT controller 1, as well as generating a panel timing signal PTMG based on the display timing signal sent from the CRT controller. The panel controller 2 also converts pixel data sent from the CRT controller 1 to panel data and outputs it to the flat panel display 7 through the panel data bus PADB.

Figure 2:
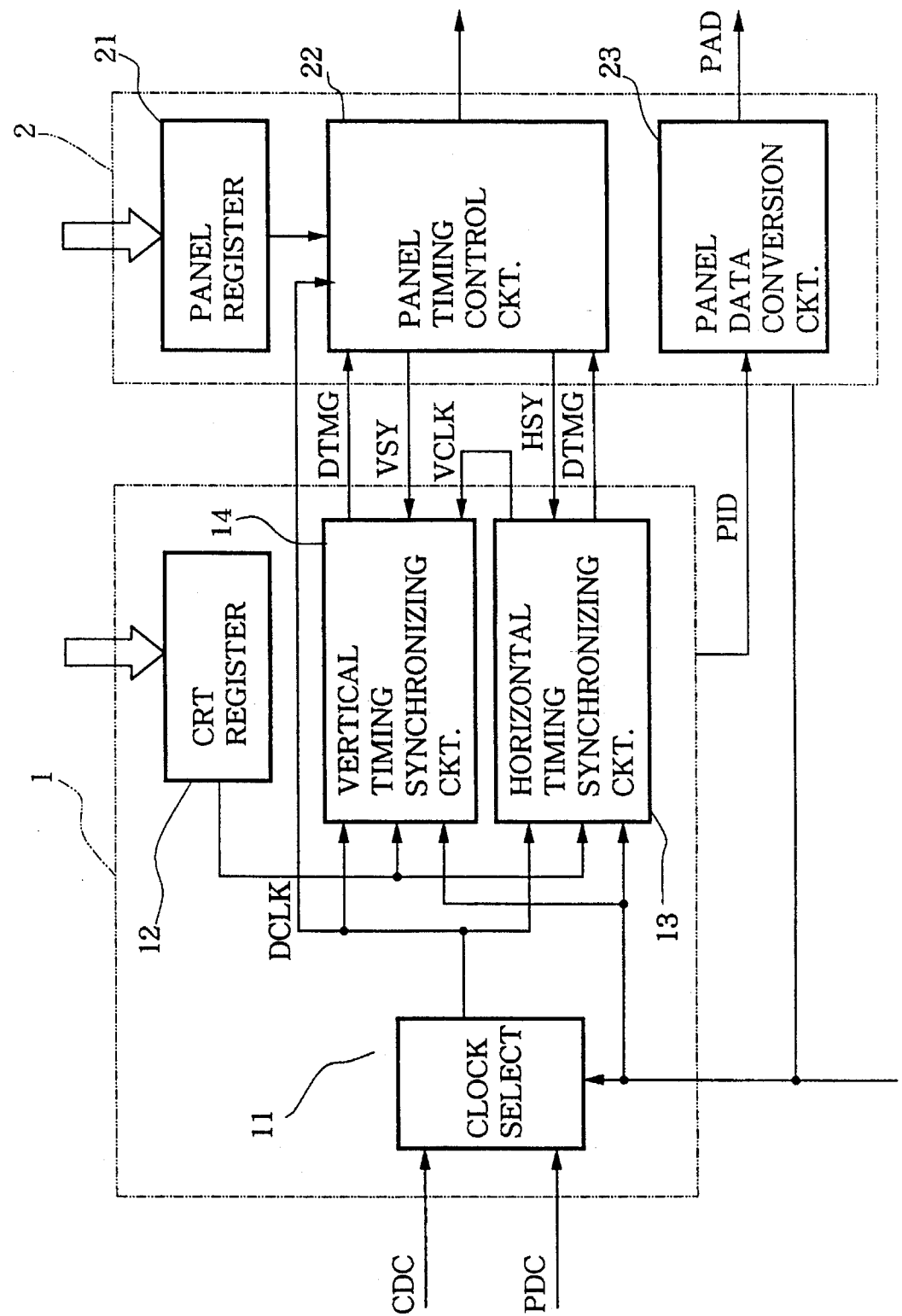
FIG. 2 is a block diagram of an essential portion of a CRT controller and a panel controller in the display controller.

FIG. 2 is a block diagram showing a timing generation section of the CRT controller 1 and the panel controller 2 in detail.

The CRT controller 1 is provided with a CRT register 12, in which various CRT display timing data rewritable by the application program, later discribed, are stored. A horizontal timing synchronizing circuit 13 and a vertical timing synchronizing circuit 14 produce various timing signals for the CRT display and the panel display on the basis of a dot clock DCLK for the CRT or the panel selected by a clock selection circuit 11, the display selection signal SW and the display timing data stored in the CRT register 12.

The panel controller 2 is provided with a panel register 21, in which panel display timing data, rewritable by the application program, is stored. A panel timing control circuit 22 generates the horizontal synchronizing signal HSY and the vertical synchronizing signal VSY on the basis of the contents stored in the panel register 21 and the dot clock DCLK for the panel selected by the clock selection circuit 11, and supplies them respectively to the horizontal timing synchronizing signal circuit 13 and the vertical timing synchronizing signal circuit 14. A panel data conversion circuit 23 applies processing such as graduation to the pixel data PID produced by the CRT controller 1 to produce panel data PAD for the flat panel display.

Figure 3:
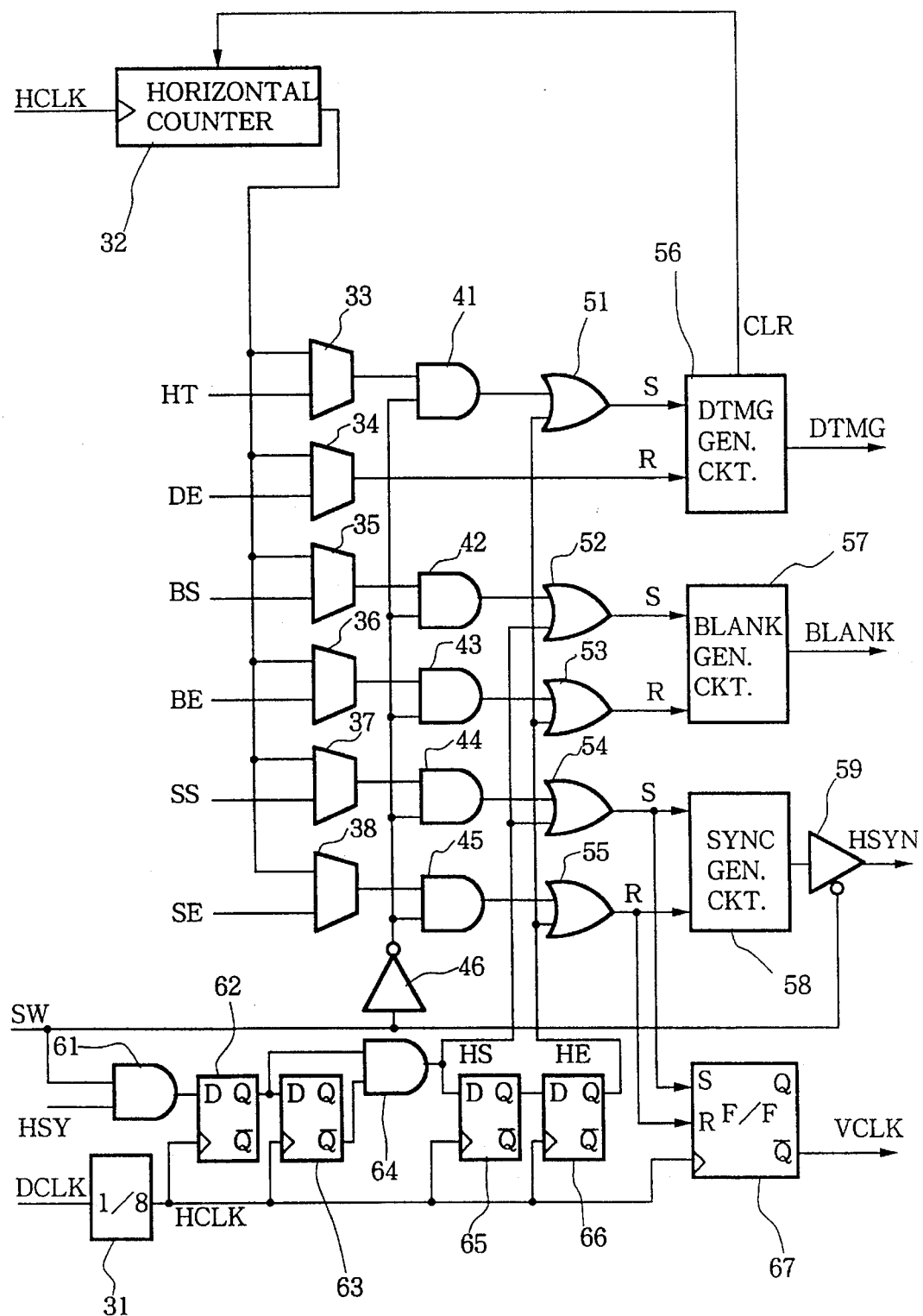
FIG. 3 is a block diagram of a horizontal timing synchronizing circuit of the CRT controller.

FIG. 3 is a block diagram showing a specific construction of the horizontal timing synchronizing signal circuit 13.

The dot clock DCLK for the CRT or the panel is frequency divided to ⅛, for example, by a frequency dividing circuit 31, and supplied in the form of a horizontal clock HCLK as clock signals to D-type flip-flops 62, 63, 65 and 66. The horizontal clock HCLK is supplied to a horizontal direction counter 32, where a dot address in the horizontal direction is generated.

The output of the horizontal counter 32 is compared with various timing data HT, DE, BS, BE, SS and SE respectively set in the CRT register 12 by 6 comparators 33 to 38. These timing data represent a horizontal total time (HT), a display enable start timing (DE), a blanking start timing (BS), a blanking end timing (BE), a synchronizing signal start timing (SS) and a synchronizing signal end timing (SE) as shown in FIG. 4 for example, and their edges are detected by the comparators 33 to 38.

Outputs of the comparators 33 and 35 to 38, which determine display timing of the CRT display when the display selection signal SW is "0", are gated out of AND gates 41 to 45 by the gate control signal supplied through an inverter 46, and are supplied as a set signal and a reset signal of a DTMG generation circuit 56, a BLANK generation circuit 57 and a SYNC generation circuit 58 through OR gates 51 to 55. The DTMG generation circuit 56, the BLANK generation circuit 57 and the SYNC generation circuit 58, each of which consists of an RS flip-flop, are set or reset by the outputs of the OR gates 51 to 55, and produce the display timing signal DTMG, the blanking signal BLANK and the horizontal synchronizing signal HSYN. The output of the SYNC generation circuit 58 is provided through a buffer 59 controlled between conduction and non-conduction states by the display switching signal SW.

The horizontal synchronizing signal HSY produced by the panel controller 2 is applied to the D-type flip-flops 62 and 63 serially connected through the AND gate 61. The Input and the Inverted output of the D-type flip-flop 63 are applied to an AND gate 64, where rising of delayed output of the horizontal synchronizing signal HSY is detected. The output of the AND gate 64 is applied to 2-stage D-type flip-flops 65 and 66. These D-type flip-flops 62, 63, 65 and 66 generate the panel timing. Accordingly, when the display selection signal SW is "1", the horizontal synchronizing signal HSY is supplied to the D-type flip-flop 62 by the AND gate 61, and the outputs of the AND gate 64 and the D-type flip-flop 66 are supplied to the generation circuits 56 to 58 as the each signal through OR gates 51 to 55 respectively as the horizontal synchronizing start timing HS and the horizontal synchronizing end timing HE.

The outputs of the OR gates 54 and 55 are applied respectively to a set input terminal S and a reset input terminal R of an SR flip-flop circuit 67. The flip-flop circuit 67 supplies a horizontal clock VCLK from its inverted output terminal to the vertical timing synchronizing circuit 14.

The vertical timing synchronizing circuit 14 has a similar construction to that of the above described horizontal timing synchronizing circuit 13. In this circuit 14, an output of a horizontal counter 71, which counts the vertical clock VCLK is compared with the timing information such as vertical total time VT, DE, BS, BE, SS and SE set in the CRT register by comparators 72 to 77. The comparison outputs set or reset a DTMG generation circuit 93, a BLANK generation circuit 94 and a SYNC generation circuit 95 through AND gates 81 to 85 and OR gates 86 to 92. This circuit 14 also has an inverter 96 and a buffer 97 in order to switch the CRT display and the panel display.

Furthermore, the vertical clock VCLK is applied to D-type flip-flops 101 and 102 cascade-connected through an AND gate 100, and its rising edge is detected by an AND gate 103 and the vertical synchronizing start timing VS and the vertical synchronizing end timing VE are generated by a D-type flip-flop 104.

The operation of this embodiment constructed in the above described manner will be described below.

When driving the unillustrated CRT controller, the display switching signal SW is set to "0". In this case, the CRT dot clock CDC is selected by the clock selection circuit 11. As the horizontal synchronizing signal HSY and the vertical synchronizing signal VSY are nullified by the AND gates 61 and 100 in the respective synchronizing circuits 13 and 14, and the AND gates 41 to 45, 81 to 85 are enabled. Then the respective timing generation circuits 56 to 58 and 93 to 95 produce various timing signals based on set values of the CRT register 12.

Figure 4A:
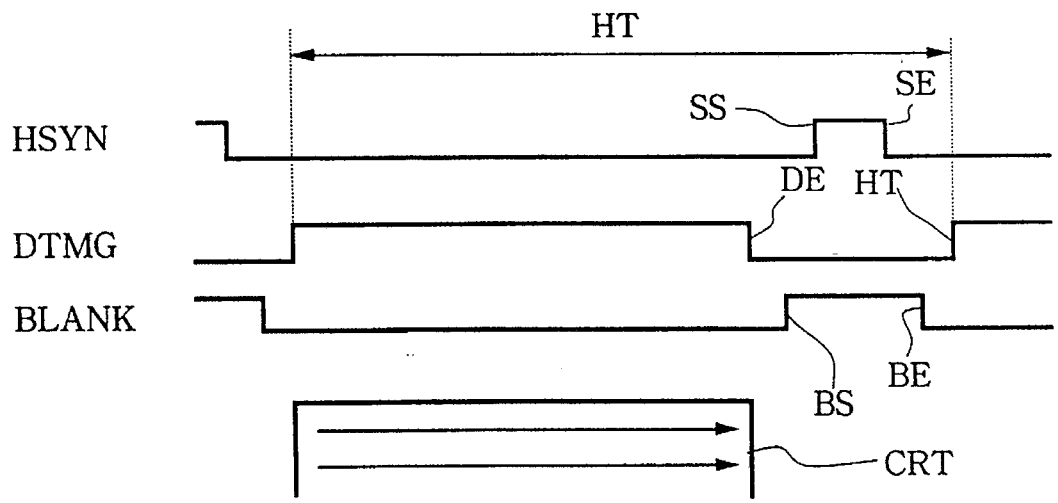
FIGS. 4A and 4B are time charts showing the operation of the horizontal timing synchronizing circuit.

The CRT display timing in the above operation is shown in FIG. 4A. The horizontal synchronizing signal HSYN is set by the data SS and SE, the display timing signal DTMG is set by the data DE and HT, and the blanking signal BLANK is determined by the data BS and BE. Rising of the display timing signal DTMG is also used as a signal for clearing contents of the horizontal counter 32.

When operating the flat panel display 7, the display switching signal SW is set to "1". In this state, as .the panel dot clock PDC is selected by the clock select signal 11, not only the panel controller 2 but also the CRT controller 1 is operated by the panel dot clock PDC.

Figure 4B:
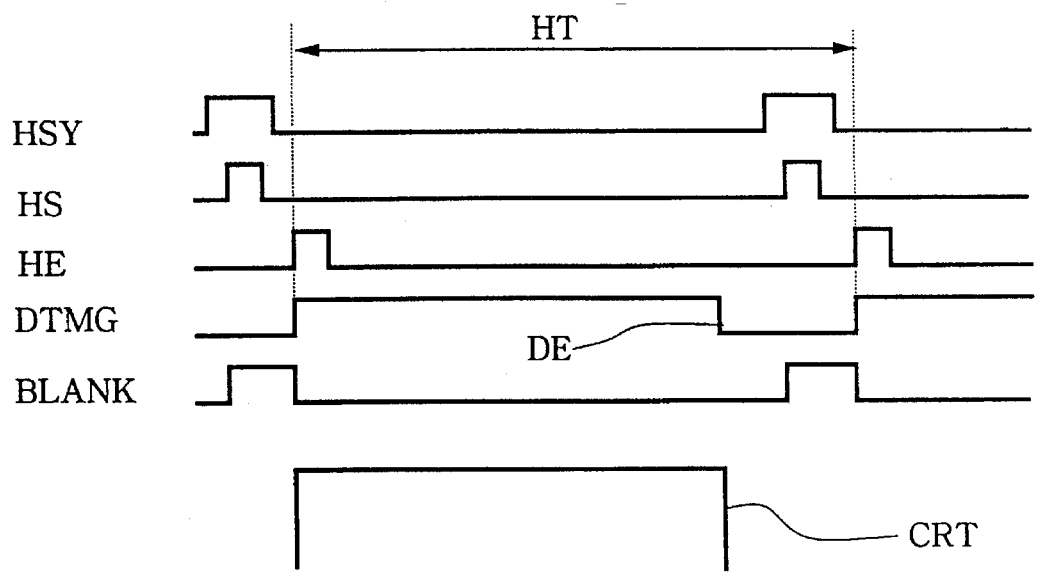
Figure 5:
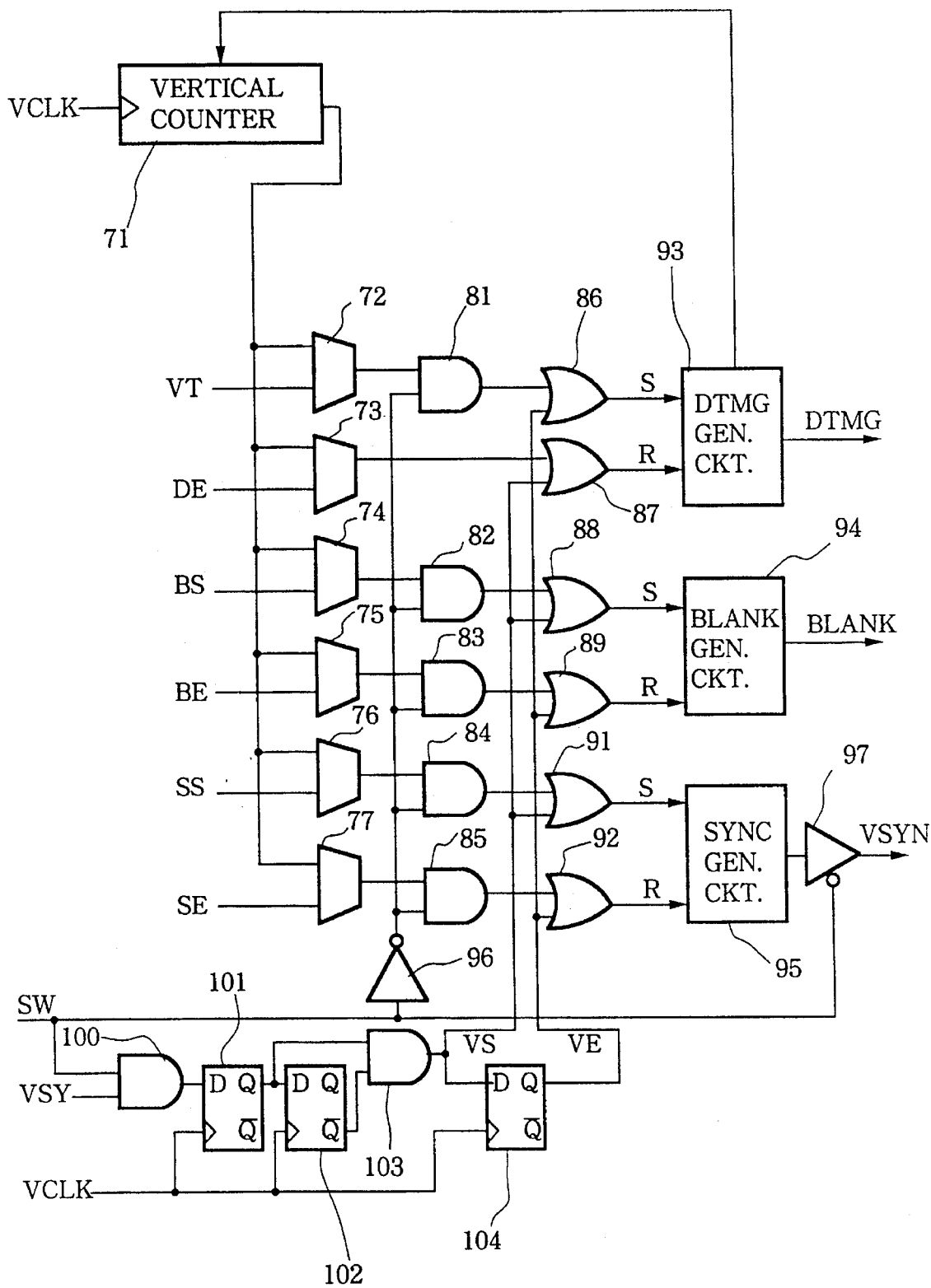
FIG. 5 is a block diagram of a vertical timing synchronizing circuit of the CRT controller.

The display timing in the above operation is shown in FIG. 4B. As shown in the diagram, even if the value of the data DE set in the CRT register 12 is the same as that of FIG. 4A, their timings are different from each other since the frequency of the dot clocks are different.

In the panel display mode, as the AND gates 61 and 100 are enabled, and the AND gates 41 to 45 and 81 to 85 are disabled, synchronizing start and end timings HS, HE, VS and VE are generated by the synchronizing signal HSY and VSY produced by the panel controller 2. Then, these timing signals are supplied to the timing generation circuit 56 to 58 and 93 to 95, and the timing signal DTMG as shown in FIG. 4B and the blanking signal BLANK are generated. Also, VCLK is generated by the same signal as the blanking signal.

Also in the vertical timing synchronizing circuit 14, the respective timing signals are generated by the same processing as above described.

According to this display controller, even if the data DE in the CRT register 12 is rewritten, a display operation based on the rewritten contents can be made in the panel display 7 without failure.

What is claimed is:

1. A display control device performing, in accordance with an application program prepared for a first display, a display control for a second display, the display control device comprising:

clock generation means for generating a basic clock for driving the second display;

a first controller including a first timing control register for rewriting contents thereof in accordance with the application program in response to a change in a display mode of the display control device, the first controller generating a timing control signal and outputting display data for the first display; and a second controller including a second timing control register for setting a display timing of the second display, and the second controller producing and outputting a synchronizing signal for the second display on the basis of contents of the second timing control register and the basic clock;

wherein the synchronizing signal is provided to the first controller from the second controller; and wherein said first controller is operated by the basic clock and generates a timing signal for the second display on the basis of the synchronizing signal for the second display outputted from the second controller and the contents of the first timing control register such that the display data for the first display is outputted to the second controller from the first controller and a timing of the first controller is synchronized with the synchronizing signal from the second controller, said second controller converting the display data outputted from the first controller while outputting the converted display data to the second display.

2. A display control device in accordance with claim 1, further comprising:

display selecting means for selecting between the first and second displays; and second display timing signal generating means for generating a second display signal in accordance with a selection of the second display by said display selecting means.

3. A display control device in accordance with claim 1, wherein said first controller includes a vertical synchronizing circuit for generating a vertical timing signal for the second display and a horizontal synchronizing circuit for generating a horizontal timing signal for the second display.

4. A display control device in accordance with claim 1, wherein said first display is a CRT display and said second display is a flat panel display.

5. A display control device in accordance with claim 1, wherein the synchronization of the first controller and the conversion of the display data for the first display is performed free of a dual port memory.

6. A display control apparatus for a first type of display and a second type of display, the display control apparatus comprising:

clock generation means for generating a display clock signal;

first controlling means for generating first timing signals for the first type of display based on the display clock signal and first timing control data, said first controlling means including a first register for storing the first timing control data, the first controlling means rewriting the first timing control data in response to a change in a display mode of the display control apparatus and outputting display data for the first type of display; said first controlling means also including timing control means for generating a timing signal based on the first timing control data and the display clock signal; and second controlling means for generating second timing signals for the second type of display based on the display clock signal and second timing control data, and for generating a synchronizing signal, the synchronizing signal being provided to the first controlling means from the second controlling means to synchronize the first controller with the second timing signals for the second type of display, the second controlling means including a second register for storing the second timing control data;

wherein the first controlling means outputs the display data for the first type of display to the second controlling means from the first controlling means and a timing of the first controlling means is synchronized with the synchronizing signal from the second controlling means; and wherein the second controlling means converts the display data outputted from the first controlling means while outputting the convened display data to the second type of display.

7. A display control apparatus in accordance with claim 6, wherein the synchronization of the first controlling means and the conversion of the display data for the first type of display is performed free of a dual port memory.

8. A display control device performing, in accordance with an application program prepared for a first display, a display control for a second display, the display control device comprising:

clock generation means for generating first and second display clock signals for driving the first and second displays;

a first display controller including a first timing control register storing first display timing signal data and rewriting the first display timing signal data in accordance with the application program in response to a change in a display mode of the display control device, the first display controller outputting display data for the first display;

display selecting means for selecting one of the first and second displays;

clock selecting means, included in the first display controller, for selecting one of the first and second display clocks in response to the display selecting means; and a second display controller including a second timing control register storing second display timing data for generating a synchronizing signal for the second display which is outputted to the first display controller;

wherein the synchronizing signal is generated on the basis of the second display timing signal data in the second timing control register and the selected second display clock selected by the selecting means;

wherein the second display controller is for setting a display timing of the second display based on a display timing signal outputted from the first display controller from the second display controller;

wherein said first display controller outputs said display timing signal of the second display to the second display controller on the basis of the selected second display clock, the synchronizing signal for the second display, and the first display timing signal data stored in the first timing control register when the second display is selected;

wherein the first display controller outputs display data for the first display to the second display controller from the first display controller and a timing of the first display controller is synchronized with the synchronizing signal from the second display controller; and wherein the second display controller converts the display data outputted from the first display controller while outputting the converted display data to the second display.

9. A display control device in accordance with claim 8, wherein the synchronization of the first display controller and the conversion of the display data for the first display is performed free of a dual port memory.

10. A display control apparatus for a first type of display and a second type of display, wherein the display is controlled in accordance with a program prepared for the first display, the display control apparatus comprising:

a clock generation circuit that generates at least one basic clock signal for driving the second display;

a first controller circuit having a first timing control memory that contains first display control data which is rewritten in accordance with the application program in response to a change in a display mode of the display control device, the first controller circuit generating a timing control signal and outputting display data for the first display; and a second controller circuit having a second timing control memory that contains second display control data for setting a display timing of the second display, and the second controller circuit produces and outputs a synchronizing signal for the second display on the basis of second timing control data of the second timing control memory and the at least one basic clock;

wherein the synchronizing signal is provided to the first controller circuit from the second controller circuit; and wherein the first controller circuit is operated by the at least one basic clock and generates a timing signal for the second display on the basis of the synchronizing signal for the second display outputted from the second controller circuit and the contents of the first timing control memory such that the display data for the first display is outputted to the second controller circuit from the first controller circuit and a timing of the first controller is synchronized with the synchronizing signal from the second controller circuit, and the second controller circuit converts the display data outputted from the first controller upon receipt while outputting the converted display data to the second display.

11. A display control apparatus in accordance with claim 10, further comprising:

a display selecting circuit that selects between the first and second displays; and a second display timing signal generating circuit that generates a second display signal in accordance with a selection of the second display by said display selecting circuit.

12. A display control apparatus in accordance with claim 10, wherein the first controller circuit includes a vertical synchronizing circuit for generating a vertical timing signal for the second display and a horizontal synchronizing circuit for generating a horizontal timing signal for the second display.

13. A display control apparatus in accordance with claim 10, wherein the first display is a CRT display and the second display is a flat panel display.

14. A display control apparatus in accordance with claim 10, wherein the synchronization of the first controller circuit and the conversion of the display data for the first display is performed free of a dual port memory.

15. A display control apparatus for a first type of display and a second type of display, wherein the display is controlled in accordance with a program prepared for the first display, the display control apparatus comprising:

a first controller circuit having a first timing control memory that contains first display control data which is rewritten in accordance with the program in response to a change in a display mode of the display control device, the first controller circuit generating a timing control signal and outputting display data for the first display; and a second controller circuit having a second timing control memory that contains second display control data for setting a display timing of the second display, and the second controller circuit produces and outputs a synchronizing signal for the second display on the basis of second timing control data of the second timing control memory;

wherein the synchronizing signal is provided to the first controller circuit from the second controller circuit; and wherein the first controller circuit generates a timing signal for the second display on the basis of the synchronizing signal for the second display outputted from the second controller circuit and the contents of the first timing control memory such that the display data for the first display is outputted to the second controller circuit from the first controller circuit and a timing of the first controller circuit is synchronized with the synchronizing signal from the second controller circuit, and the second controller circuit converts the display data outputted from the first controller upon receipt while outputting the converted display data to the second display.

16. A display control apparatus in accordance with claim 15, further comprising:

a display selecting circuit that selects between the first and second displays; and a second display timing signal generating circuit that generates a second display signal in accordance with a selection of the second display by said display selecting circuit.

17. A display control apparatus in accordance with claim 15, wherein the first controller circuit includes a vertical synchronizing circuit for generating a vertical timing signal for the second display and a horizontal synchronizing circuit for generating a horizontal timing signal for the second display.

18. A display control apparatus in accordance with claim 12, wherein the first display is a CRT display and the second display is a flat panel display.

19. A display control apparatus in accordance with claim 15, wherein the synchronization of the first controller circuit and the conversion of the display data for the first display is performed free of a dual port memory.

20. A display control apparatus for a first type of display and a second type of display, wherein the display is controlled in accordance with a program prepared for the first display, the display control apparatus comprising:

a clock generation circuit that generates at least one basic clock signal for driving the second display;

a first controller circuit having a first timing control memory that contains first display control data which is be rewritten in accordance with the application program in response to a change in a display mode of the display control device, the first controller circuit generating a timing control signal and outputting display data for the first display; and a second controller circuit having a second timing control memory that contains second display control data for setting a display timing of the second display, and the second controller circuit produces and outputs a synchronizing signal for the second display on the basis of second timing control data of the second timing control memory and the at least one basic clock;

wherein the synchronizing signal is provided to the first controller circuit and controls the first controller from the second controller circuit to control and adjust a timing of the first controller circuit; and wherein the first controller circuit is operated by the at least one basic clock and generates a timing signal for the second display on the basis of the synchronizing signal for the second display outputted from the second controller circuit and the contents of the first timing control memory such that the display data for the first display is outputted to the second controller circuit from the first controller circuit and the timing of the first controller circuit is adjusted and synchronized with the synchronizing signal from the second controller circuit, and the second controller circuit converts the display data outputted from the first controller upon receipt while outputting the converted display data to the second display;

wherein the synchronization of the first controller and the conversion of the display data for the first display is performed free of a dual port memory.

21. A display control apparatus for a first type of display and a second type of display, wherein the display is controlled in accordance with a program prepared for the first display, the display control apparatus comprising:

a first controller circuit having a first timing control memory that contains first display control data which is rewritten in accordance with the program in response to a change in a display mode of the display control device, the first controller circuit generating a timing control signal and outputting display data for the first display; and a second controller circuit having a second timing control memory that contains second display control data for setting a display timing of the second display, and the second controller circuit produces and outputs a synchronizing signal for the second display on the basis of second timing control data of the second timing control memory;

wherein the synchronizing signal is provided to the first controller circuit from the second controller circuit to control and adjust a timing of the first controller circuit; and wherein the first controller circuit generates a timing signal for the second display on the basis of the synchronizing signal for the second display outputted from the second controller circuit and the contents of the first timing control memory such that the display data for the first display is outputted to the second controller circuit from the first controller circuit and the timing of the first controller circuit is adjusted and synchronized with the synchronizing signal from the second controller circuit, and the second controller circuit converts the display data outputted from the first controller upon receipt while outputting the converted display data to the second display;

wherein the synchronization of the first controller and the conversion of the display data for the first display is performed free of a dual port memory.

* * * * *